Jan. 25, 1966  B. LEVENETZ  3,230,981
FILAMENT WOUND STRUCTURE AND METHOD OF MAKING SAME
Filed March 19, 1963  3 Sheets-Sheet 1

INVENTOR.
BORIS LEVENETZ
BY

Jan. 25, 1966   B. LEVENETZ   3,230,981
FILAMENT WOUND STRUCTURE AND METHOD OF MAKING SAME
Filed March 19, 1963   3 Sheets-Sheet 3

INVENTOR.
BORIS LEVENETZ
BY

United States Patent Office 3,230,981
Patented Jan. 25, 1966

3,230,981
FILAMENT WOUND STRUCTURE AND METHOD
OF MAKING SAME
Boris Levenetz, San Diego, Calif., assignor to Whittaker
Corporation, a corporation of California
Filed Mar. 19, 1963, Ser. No. 266,448
8 Claims. (Cl. 138—148)

This invention relates to filament wound structures and to methods of making same and is more specifically directed to a composite filament wound structure comprising a plurality of similar sections joined together to form a single elongated, continuous, cylindrical structure.

There presently is a considerable demand for filament wound pressure vessels and structures which are made from filament windings. It has been established that glass filaments as employed in filament wound structures can exhibit specific strengths (strength to weight ratios) in magnitude up to $3.5 \times 10^6$ inches, or specific strengths 3 or 4 times better than metal. Accordingly, continuous development work has been conducted with filament wound structures in order to obtain a structure which has a higher strength to weight ratio than present structures constructed solely from non-fibrous metal components. One of the features of this invention is to make a large tubular structure which essentially consists of a plurality of similar segmented sections which are filament wound, and a novel means for joining the respective sections together to form a single large integral structure.

It can be appreciated that the tremendous size of present day missiles and space structures as well as the coming generation of large solid propellant boosters for civilian and military missions have created new problems with regard to transportion, handling, assembly, and inspection. By segmenting the cylindrical portion of the respective structures into short cylinders, many of these problems can be solved or at least minimized. The segmented structure concept necessitated the resolution of problems created in applying the concept. Efficient means and methods had to be devised for joining segments in a simple, effective, and reliable manner. Any segmented structure has to necessarily include structural joints. The mere presence of such joints, even with the utilization of homogeneous segment materials results in reduced reliability, additional weight, higher cost and lower material efficiency.

The joint design of a structure made from filament wound segmented sections is further complicated by the requirement for an oriented load carrying reinforcement. In order to be successful, the design of the segmented structure joints has to take into account such requirements as material compatibility, load pattern, fabrication techniques, and has to provide for ease of field assembly.

The instant invention solves the above problems by providing a plurality of similar filament wound structures so formed as to be readily fastened together by a simplified means of attachment, as will be more fully described hereafter.

The invention as shown here further solves many problems peculiar to cylindrical wall structure design. A cylindrical structure is subjected primarily to two types of pressure: internal and external. Internal pressure generates essentially two basic types of loading in the cylinder walls; namely, circumferential and longitudinal. A structure composed of filaments must therefore have its fibers oriented predominantly in these two directions to most efficiently support the internal pressures generated.

The external loads present in an elongated tubular structure for space applications would be compression, bending, shear generated by the weight of the upper stages, acceleration, winds, and various other environment forces encountered during use. The tubular structure therefore must be designed to also consider the external loads encountered, some of which might be superimposed upon the internal pressures generated. To efficiently support the externally generated forces, the supporting fibers should be predominantly oriented in the longitudinal direction. Tubular structures heretofore constructed generally consisted of filaments wound in a helical fashion, but such structures, not having the filaments predominantly in a longitudinal direction, did not serve to adequately or efficiently support all the external forces to which such structure was subject to, thereby resulting in a relatively weak structure. Winding at a helical angle can also decrease the modulus of elasticity thereby causing relatively large deflections of the structure, and should therefore be avoided.

It should be noted that the critical compression stress in filament wound sandwich structures is about ⅓ that of the tensile stress. In addition to this inherent deficiency in compressive applications, the stability of the wall structure against buckling is a problem.

Comparisons made between a solid wall and a sandwich cylinder under external pressure, shows the sandwich cylinder is superior weight-wise and permits better utilization of the materials in tension and compression. Applicant's structure has a predominance of longitudinally oriented filaments contained therein which provides a means for preventing the buckling set forth above.

Accordingly, an object of the invention is to provide an integral structure comprised of a plurality of similar sandwich sections joined by a unique junction structure.

Another object of the invention is to provide a cylindrical structure which has a high strength to weight characteristic.

Still another object of the invention is to provide a tubular filament wound structure constructed from a plurality of individual filament wound tubular structures which are adapted to be joined together in a manner whereby a longitudinal load stress is evenly carried by the respective adjacent structures.

Yet another object of the invention is to provide a segmented structure which can be easily assembled and disassembled.

A further object of the invention is to provide a cylindrical segmented structure having a minimum aerodynamic drag by virtue of its smooth outer surface.

Other and different objects of the invention will be apparent from the specifications and drawings, in which FIGURE 1 is a perspective view of a structure formed from a plurality of individual segments.

Figure 1:
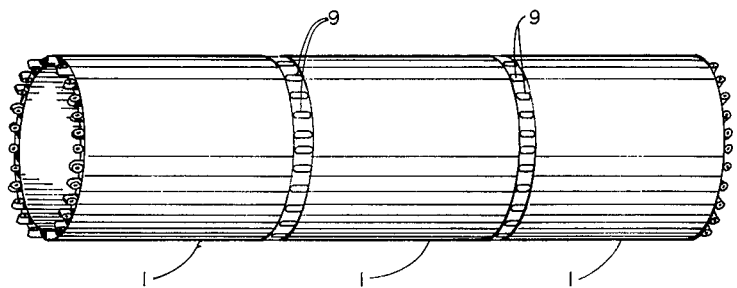

The invention generally consists of a plurality of individual sections joined together to form a single integral elongated body. Each individual section includes an inner filament wound shell and an outer filament wound shell with a ribbon-like loop interposed therebetween to serve as the core of each respective structure. The fibrous material used to form the inner and outer shell is generally of glass, wire, or other material capable of being drawn into a fiber and having a high inherent strength. The inner shell is generally formed by winding a filament about a reusable mandrel with the respective turns of the filament being in close proximity. Several layers of filament are wound upon the mandrel to form the single inner shell. A suitable settable binder such as an epoxy resin is deposited on the windings of the inner shell and then cured to maintain the respective filaments in their defined respective position and thereby form a solid structure. The inner shell is primarily constructed of filaments with a binder applied thereto, the structural integrity being due primarily to the presence of the fibers. A fortiori, any loads generated in the shell structure are mainly supported by the filaments.

The spacer or core structure generally consists of a plurality of prefabricated loops constructed from individual filaments bound together by a suitable binder. Each loop is placed on end and about two studs, each stud being on opposite ends of the cylinder, thereby presenting a core structure consisting of a plurality of longitudinally extending parallel loops laid on end and extending from one end of the cylinder to the other.

A filament is then wound about the outside of the inner shell with the ribbon-like element disposed thereon to complete the enclosed casing. The outer shell primarily consists again of a filament wound structure having a settable binder deposited thereon which binder, when cured, results in a rigid outer shell. The structure of the outer shell and the inner shell can be substantially identical by differing only in diameter size.

The core structure is attached to the inner and outer members by suitable adhesive means to prevent relative displacement therebetween.

The segments are then ready for attachment to each other. This is accomplished by attaching a plurality of coupling plates to the ends of the respective studs of the segments and securing the plates thereto by nuts or other position retaining means. In this manner, an elongated composite structure is formed, having a continuous distribution of longitudinally created loads about its entire length.

As regards to fibers or filaments heretofore mentioned, glass is the presently preferred material for them, if the structure is to be rigid. It is not contemplated, however, that the invention be so limited inasmuch as other and different fibrous materials such as metal wires or elastomeric materials can be used depending on the particular characteristics desired.

Though epoxy resins are presently preferred as the binder material, again this is solely by way of illustration and not limitation. The particular resin or binder used would be dictated by the end requirements of the structure. If a flexible structure is desired, flexible resins will, of course, have to be incorporated in the construction of the segment.

Referring to FIGURE 1, we have an elongated tubular structure generally consisting of a plurality of substantially identical segments 1, 1' and 1". Each of the segments 1 are joined together by suitable fastening means generally shown at 9 to form a composite structure. The integral structure can contain any number of individual segments, the number of segments utilized being dependent solely on the length of the structure desired. Furthermore, the lengths of the individual segments can be varied to suit specific design requirements without departing from the scope of this invention. In this particular illustration, we see only a showing of straight tubular members joined together to form a straight integral structure. It is contemplated that the principles of this invention can be applied to structures having turns or curved areas therein made by joining curved segments together, as taught by this invention.

Figure 2:
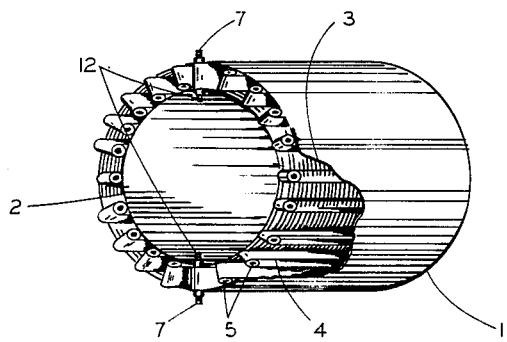
FIGURE 2 is a perspective view of one of the segments shown in FIGURE 1 with a cutaway portion showing the core structure.

FIGURE 2 is an enlarged showing of each of the individual segments of FIGURE 1. As can be readily seen from FIGURE 2, each segment includes an inner shell 2 and an outer shell 3 disposed concentric to the inner shell 2. Interposed between the inner casing 2 and outer casing 3 is a spacer or core structure generally consisting of a ribbon-like member 4.

The ribbon-like member 4 is a band constructed from a plurality of longitudinally disposed filaments. The band is a continuous loop, having no beginning or end, and approximately twice as long as the length of each segment. The core structure is formed by preplacing a plurality of studs 5 about the periphery of the ends of the cylindrical structure 1. Each loop 4 is then placed about two studs, each stud on opposite ends of the segment. This results in a plurality of loops having substantially parallel sections lying on end to provide a support for the outer shell 3.

Figure 3:
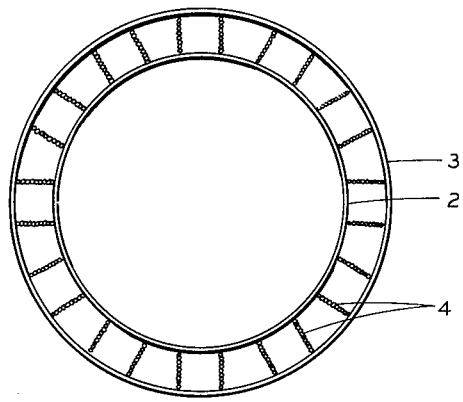
FIGURE 3 is a section of the segment shown in FIGURE 2.

FIGURE 3 is a showing of a cross section taken through lines 3—3 of FIGURE 2 and presents a clear end view showing of inner shell 2 and outer shell 3 with the ribbon-like supporting element 4 disposed therebetween. It can be seen in FIGURE 3 that the ribbon-like elements 4 are interposed between the inner and outer shells in such a manner that they are laid on end and are substantially perpendicular to a tangent drawn at the point of contact by the member 4 with the respective inner and outer shells.

Figure 4:
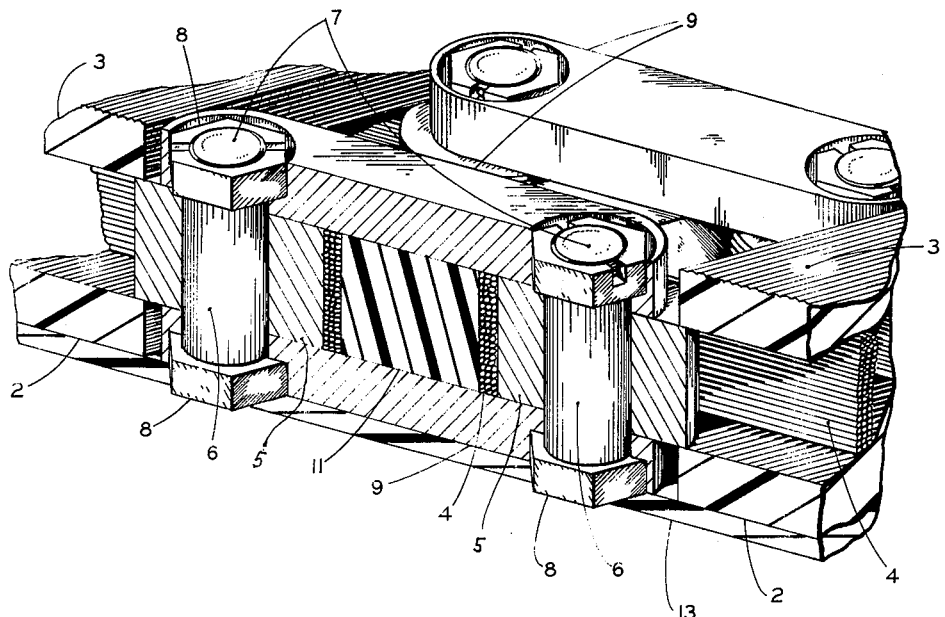
FIGURE 4 is a detailed section of the juncture means whereby individual sections are joined together.
Figure 7:
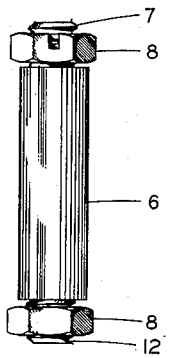
FIGURE 7 is a showing of the studs and respective nuts used in joining the respective segments.
Figure 8:
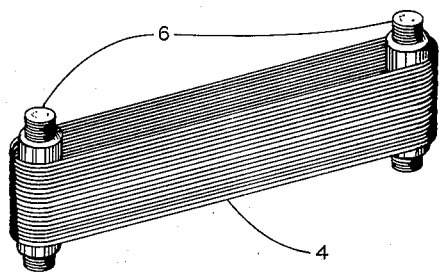
FIGURE 8 is a perspective view of a filament loop in place about two complementary studs.

FIGURE 4 is a detailed showing of the unique fastening means which provides a fastening structure for the respective segments and which serves to efficiently transmit longitudinal loads in an efficient fashion between the respective segments. The studs, as more particularly shown in FIGURE 7, include a generally cylindrical middle portion 6 having an inner threaded extension 12 and an outer threaded extension 7. These threaded extensions 7 and 12 are adapted to receive nuts 8 to secure plates 9 thereto.

Figure 5:
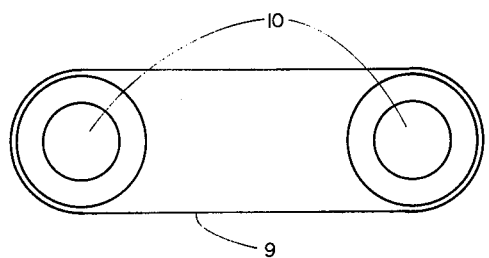
FIGURE 5 is a plan view of the plates used to join the respective segments together.
Figure 6:
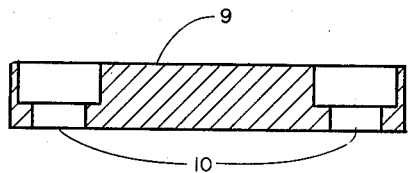
FIGURE 6 is an elevation view of the plate of FIGURE 5.

FIGURES 5 and 6 show in detail connecting plates 9 which generally consist of a flat plate 9 having two apertures 10 in the respective end portions thereof. The apertures 10 are adapted to receive the extensions 7 and 12 of the studs 5. Two joining plates 9 are used with each pair of joining studs 5.

The respective segments are joined together in the following manner: the segments 1 desired to be joined together are placed in an end to end position, with the respective array of studs 5 of each segment 1 being disposed opposite one another. A connecting plate 9 has the inner extensions 12 of opposite studs deposited in the end apertures 10 of the plate and nuts 8 are turned onto the extensions 12 to secure the plates 9 to the studs 5. All the complementary inner stud extensions 12 on adjoining segments are joined in like manner. Thereupon, a compression ring 11 is inserted between the studs 5 to fill the gap therebetween. Subsequently, plates 9 are disposed between the outer extensions 7 of the studs 5 of the adjoining segments and secured thereto by nuts 8.

This construction affords an opportunity for longitudinal developed external forces to be carried throughout the entire length of the integral structure as opposed to its being concentrated in the respective sections, thereby insuring a greater load carrying capacity.

It is readily apparent that the longitudinal loads from the studs on one end of the segment are transmitted to the studs directly opposite said stud to the stud on the opposite end of the segment 1. Since each loop 4 is a continuous band, the loads generated on one side of the structure are transmitted readily to the other side of the structure and if joined together as shown in FIGURE 4, the longitudinal loads are transmitted the entire length of the resultant composite structure.

As herein described, the invention contemplates an elongated tubular structure comprised of a plurality of individual segments. With the particular construction of the joints as shown in FIGURE 4, we can construct a body having a smooth outer structure which would not aerodynamically affect the outer surface of the structure, an important consideration if the structure were being used as the outer casing of a missile.

The inner surface of the structure is also smooth as shown in FIGURE 4. If desired, an inner casing liner 13 can be inserted to provide a barrier between the material contained in the structure and the wall structure itself.

Further structural integrity can be obtained by filling the void spaces between the respective parallel sections of the band 4 with a structural material such as honeycomb core. This interposition of honeycomb core would increase the compressive force load bearing capacity of the composite structure.

While I have shown and described my invention in a preferred form, I am aware that various changes and modifications may be made therein without departing from the principles of the invention, the scope of which may be determined by reference to the appended claims.

I claim:
1. A structural element comprising
a filament wound inner tubular member,
a filament wound outer tubular member,
and a plurality of filament wound closed loops extending in a longitudinal fashion between said inner tubular member and said outer tubular member.

2. A casing comprising
an inner tubular and outer tubular member,
said inner and outer members essentially consisting of a plurality of circumferentially wound filaments joined by a suitable binder,
separator means interposed between said inner and outer members comprising a plurality of filament wound closed loops running in a direction substantially parallel to the axis of rotation of said tubular members.

3. A casing as set forth in claim 2 wherein said separator means further includes a structural core material which substantially fills the open areas between the parallel bands and is adapted to support compressive forces generated in the casing.

4. An elongated hollow vessel comprising
at least two similar structures connected in tandem,
each of said structures including an inner filament wound tubular member and an outer filament wound tubular member,
a plurality of guide means positioned near the ends of the tubular members and about their circumference,
a plurality of ribbon-like filament wound loops laid on end between said inner and outer members,
said loops being wound about said guide means in a manner to provide a plurality of longitudinally extending substantially parallel bands running the length of said structure,
and means for connecting the guide means of one structure to the adjacent structure whereby a single, continuous, elongated, tubular vessel is formed from a plurality of smaller tubular structures and wherein longitudinal loads exerted upon one structure are directly transmitted by said loops to the adjacent structure.

5. A vessel as set forth in claim 4 wherein core material is interposed between said loops.

6. A vessel as set forth in claim 8 wherein filler means are interposed between the respective similar structures.

7. A structural member having concentric inner and outer shells with a core means disposed therebetween, said core means comprising
a plurality of filament wound closed loops laid on end and extending in longitudinal fashion between said inner and outer members and presenting a plurality of substantially parallel load supporting sections.

8. A composite structure comprising a plurality of substantially identical segments, each segment including an inner wall of circumferentially oriented thin filaments bonded by an adhesive,
an outer wall of circumferentially oriented thin filaments bonded by an adhesive,
a plurality of closed loop bands made from a plurality of thin filaments bonded by an adhesive,
said bands being laid on end and being longitudinally oriented between said inner and outer walls to form a core therebetween, and
means for connecting the bands of one segment with complementary bands of an adjacent segment to transmit longitudinally generated stresses throughout the entire composite body.

References Cited by the Examiner

UNITED STATES PATENTS

| | | | |
|---|---|---|---|
| 758,985 | 5/1904 | Liebl | 285—420 X |
| 825,392 | 7/1906 | Keenan et al. | 285—288 X |
| 979,285 | 12/1910 | Gilligan | 285—288 |
| 1,677,714 | 7/1928 | Frease | 138—148 X |
| 1,930,285 | 10/1933 | Robinson | 138—148 X |
| 2,775,262 | 12/1956 | Wread | 138—144 X |
| 2,937,662 | 5/1960 | Green | 138—149 X |
| 3,002,534 | 10/1961 | Noland | 138—144 X |

FOREIGN PATENTS

| | | |
|---|---|---|
| 823,579 | 12/1951 | Germany. |
| 854,130 | 10/1952 | Germany. |
| 908,127 | 10/1962 | Great Britain. |

LAVERNE D. GEIGER, *Primary Examiner.*

EDWARD V. BENHAM, *Examiner.*

C. HOUCK, *Assistant Examiner.*